United States Patent
Peyton

(10) Patent No.: US 10,792,964 B1
(45) Date of Patent: Oct. 6, 2020

(54) TRAILER SUITABLE FOR MULTI-CONFIGURATION AFFIXATION TO ALL-TERRAIN VEHICLES

(71) Applicant: Robert L Peyton, Boomer, WV (US)

(72) Inventor: Robert L Peyton, Boomer, WV (US)

(*) Notice: Subject to any disclaimer, the term of this patent is extended or adjusted under 35 U.S.C. 154(b) by 0 days.

(21) Appl. No.: 16/813,924

(22) Filed: Mar. 10, 2020

Related U.S. Application Data

(60) Provisional application No. 62/818,565, filed on Mar. 14, 2019.

(51) Int. Cl.
*B60D 1/06* (2006.01)
*B62D 63/08* (2006.01)
*B62D 63/06* (2006.01)

(52) U.S. Cl.
CPC ............ *B60D 1/06* (2013.01); *B62D 63/062* (2013.01); *B62D 63/08* (2013.01)

(58) Field of Classification Search
CPC ...... B62D 63/08; B62D 63/062; B62D 63/00; B62D 21/20; B62D 63/061; B60D 1/06; B60D 1/54; B60D 2001/001; B62B 1/02; B62B 1/04; B62B 5/0003
USPC ............................ 280/656, 789; 287/27, 511
See application file for complete search history.

(56) References Cited

U.S. PATENT DOCUMENTS

| | | | |
|---|---|---|---|
| 3,572,764 A * | 3/1971 | Rubin | B60D 1/54 280/491.2 |
| 5,354,090 A | 10/1994 | Grovom | |
| 5,489,109 A | 2/1996 | Murphy | |
| 6,024,374 A | 2/2000 | Friesen | |
| 6,082,755 A | 7/2000 | Topar | |
| 6,254,117 B1 | 7/2001 | Cross | |
| 6,286,854 B1 | 11/2001 | Cross | |
| 6,419,244 B2 | 7/2002 | Meabon | |
| 6,460,887 B2 | 10/2002 | Tremblay | |
| 6,767,025 B2 | 7/2004 | Hagen | |
| 7,055,848 B1 * | 6/2006 | James | B62D 63/061 280/401 |
| 7,073,816 B1 * | 7/2006 | Larson | B62D 63/061 280/656 |
| 7,229,090 B2 | 6/2007 | Cumbie | |
| 7,401,804 B1 * | 7/2008 | Rupp | B60P 1/027 280/43.1 |
| 7,780,185 B2 | 8/2010 | McConkey et al. | |
| 8,100,624 B2 | 1/2012 | Christensen | |
| 8,123,238 B1 | 2/2012 | Burgess | |

(Continued)

*Primary Examiner* — Ruth Ilan
*Assistant Examiner* — Conan D Duda
(74) *Attorney, Agent, or Firm* — Dinsmore & Shohl LLP; Monika L'Orsa Jaensson, Esq.

(57) ABSTRACT

A trailer suitable for affixation to an all-terrain vehicle in at least two configurations, and methods for securing a trailer to an ATV. The trailer has a bed including a frame, longitudinal bars, and latitudinal bars, with a pair of wheels secured under the bed. The latitudinal bars are bent at their ends so that the ends extend beyond the sides of the bed and bend upward, with apertures positioned at each end of the latitudinal bars. A base plate is secured to and extends perpendicularly upward from the first end of the bed, with an aperture positioned thereon sized to receive a ball hitch when the trailer is affixed to the ATV in a first configuration. Affixed to the second end of the bed is a trailer coupler to receive the ball hitch for affixation to the ATV in a second configuration.

20 Claims, 5 Drawing Sheets

(56) References Cited

U.S. PATENT DOCUMENTS

| | | | |
|---|---|---|---|
| 8,596,671 B2 | 12/2013 | Myrant et al. | |
| 10,214,229 B2 | 2/2019 | Brown | |
| 2001/0026060 A1* | 10/2001 | Cross | B60D 1/155 280/456.1 |
| 2002/0195798 A1 | 12/2002 | James | |
| 2005/0248125 A1 | 11/2005 | Flynn et al. | |
| 2006/0097482 A1 | 5/2006 | Cumbie | |
| 2006/0208454 A1* | 9/2006 | Giesler | B60P 3/42 280/415.1 |
| 2007/0045993 A1* | 3/2007 | Jager | B60P 1/26 280/656 |
| 2007/0132209 A1* | 6/2007 | Winter | G01G 19/08 280/656 |
| 2007/0138784 A1* | 6/2007 | Jager | B62D 63/062 280/839 |
| 2007/0145717 A1* | 6/2007 | Winter | B62D 63/061 280/491.1 |
| 2007/0145718 A1* | 6/2007 | Winter | B60D 1/54 280/491.1 |
| 2007/0252357 A1* | 11/2007 | Hoskins | B62D 63/062 280/415.1 |
| 2010/0320739 A1* | 12/2010 | Kittrell | B60D 1/155 280/789 |
| 2011/0198824 A1* | 8/2011 | Markovich | B62D 63/062 280/400 |
| 2011/0204601 A1* | 8/2011 | Alvarino | B62D 63/061 280/656 |
| 2011/0260430 A1* | 10/2011 | Markovich | B62D 63/061 280/656 |
| 2011/0266776 A1* | 11/2011 | Kapels | B60D 1/52 280/656 |
| 2015/0016930 A1* | 1/2015 | Barnett | B60P 3/122 414/483 |
| 2015/0298594 A1 | 10/2015 | Fisk | |
| 2018/0029656 A1* | 2/2018 | Barnes | B60P 3/105 |
| 2019/0375474 A1* | 12/2019 | Duthie | B60D 1/52 |
| 2020/0156554 A1* | 5/2020 | Bradley | B60R 11/06 |

* cited by examiner

TRAILER SUITABLE FOR MULTI-CONFIGURATION AFFIXATION TO ALL-TERRAIN VEHICLES

BACKGROUND

The disclosed technology regards a trailer designed to be removably attached to the rear end of an All-Terrain Vehicle (ATV) useful for hauling harvested animals, lawn and garden equipment, dead wood and other necessary items safely and in a stabilized manner that allows the ATV to be driven on uneven and reasonably steep terrain. The trailer of the disclosed technology is further designed to be repositioned on and securely transported by the ATV, allowing for alternative coupling with the trailer hitch.

GENERAL DESCRIPTION

The disclosed technology regards a trailer designed to be removably attached to a rear end of an ATV, in multiple configurations. The trailer generally includes a bed, a pair of wheels supported under the bed at a first end, a base plate secured to and extending perpendicularly upward from the first end of the bed, and a trailer coupler affixed to a second end of the bed. The base plate has an aperture positioned thereon sized to receive a ball hitch of an ATV.

The bed of the trailer includes a frame, a plurality of longitudinal bars in the plane of and extending the length of the frame, and a plurality of latitudinal bars affixed to a top surface of the longitudinal bars and the frame. At least some of the latitudinal bars have bent ends so that the ends extend beyond the sides of the frame and upward from a midsection of the latitudinal bar and a plane of the bed. The bend at each end of at least some of the latitudinal bars commences near, at or beyond an outermost edge of the frame. Apertures are positioned at each end of the latitudinal bars.

The disclosed technology further regards methods for securing a trailer of the disclosed technology to an ATV having a ball hitch and a rear rack, in multiple configurations. One method includes providing a trailer of the disclosed technology, and securing a cam buckle around or through the rear rack of the ATV with both ends of the cam buckle positioned on opposing sides of the rack and hanging loose at the rear of the ATV. The ball hitch is then received within the aperture of the base plate of the trailer so that the trailer extends vertically above the ground and firmly resting against the frame of the ATV rear rack. The ends of the cam buckle are then secured about the bed of the trailer, and the cam buckle is tightened to ensure the trailer is firmly against the rack of the ATV. A second method includes providing a trailer of the disclosed technology, and receiving the ATV ball hitch within the trailer coupler so that the so that the wheels of the trailer are positioned on the ground, extending from a back of the ATV, with the bed of the trailer parallel with the ground.

With this novel design, the disclosed technology provides a trailer which can be removably attached to the rear end of an ATV in a first configuration for securely transporting the trailer, and further can be removably attached to the rear end of an ATV in a second configuration for safely hauling various items.

Other objects and purposes of the invention will be apparent to persons familiar with arrangements of this general type upon reading the specification and inspecting the accompanying drawings.

FIGURES

DETAILED DESCRIPTION

Figure 1:
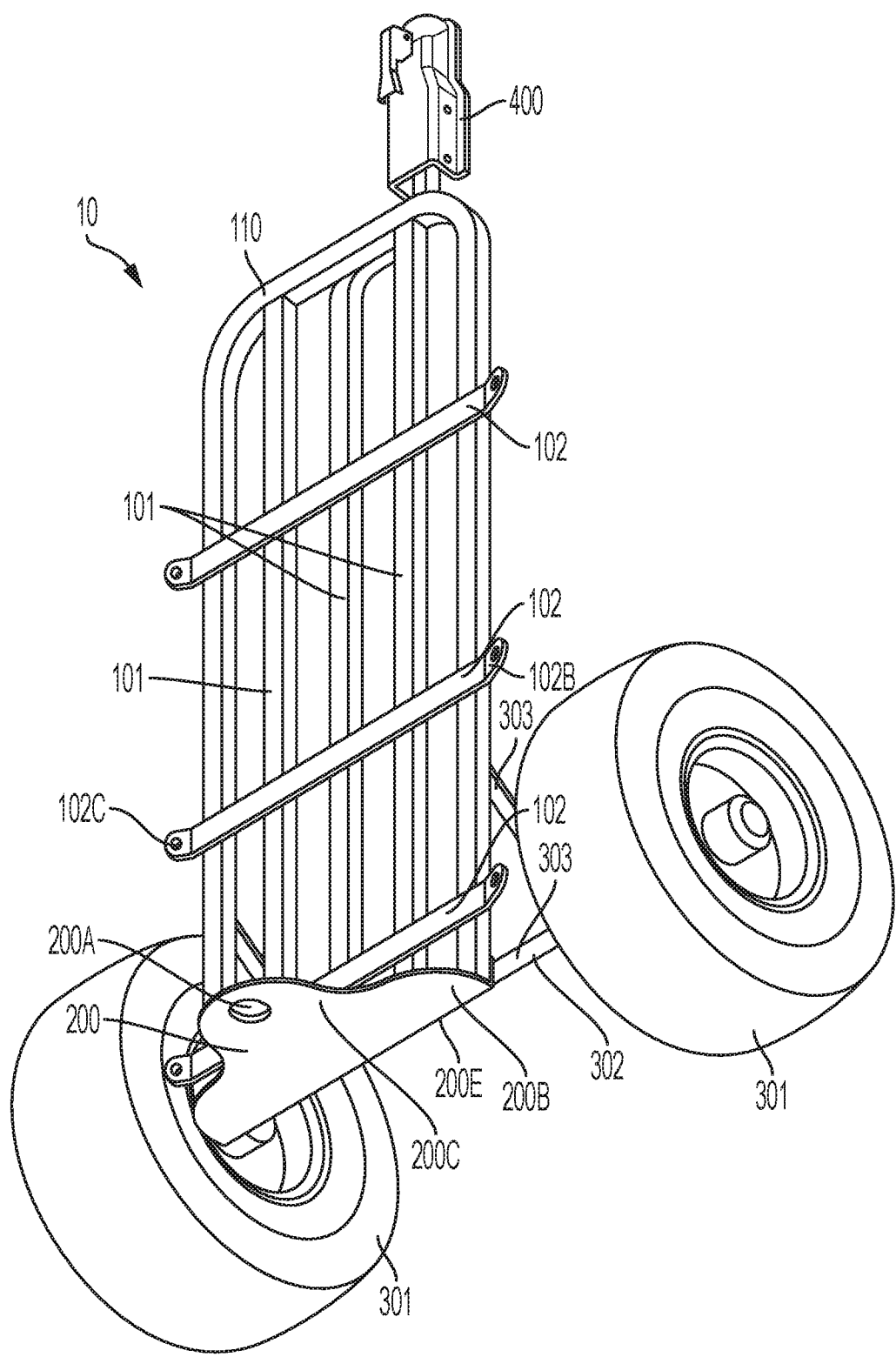
FIG. 1 is a perspective view of an embodiment of the trailer of the disclosed technology.

The disclosed technology regards a trailer designed to be removably attached to the rear end of an ATV useful for hauling harvested animals, lawn and garden equipment, dead wood and other necessary items safely and in a stabilized manner that allows the ATV to be driven on uneven and reasonably steep terrain. The trailer of the disclosed technology is further designed to be repositioned on and securely transported by the ATV, allowing for alternative coupling with the trailer hitch.

As shown in FIGS. 1-5, the trailer of the disclosed technology generally includes a bed 10, with a pair of wheels 301 supported under the bed at a first end, a base plate 200 secured to and extending perpendicularly upward from the first end of the bed, and a trailer coupler 400 affixed to the second end of the bed.

The bed 10 is formed from a frame 110, a plurality of longitudinal bars 101 affixed to and in the plane of the frame, and a plurality of latitudinal bars 102 affixed to a top surface of the frame and the longitudinal bars. By this configuration, the trailer can flexibly support multiple items, including items that exceed the dimensions of the bed.

In the embodiment shown, the frame 110 includes a plurality of bars, forming the sides of the bed and the second end thereof. The bars of the frame may be joined as a curved joint (as shown), or as a rectangular joint. In some embodiments the frame 110 may have a length of between 45-60", or 51-52", and a width of 18-22", or 20". Three or more longitudinal bars 101 may be affixed to the frame 110, in the plane of the frame, and three or more latitudinal bars 102 may be affixed to the top of the frame and the longitudinal bars 101. The frame 110 and the longitudinal bars 101 may be made from 1"×1"×1" square steel tubing, allowing the bed and the trailer to support up to 600 lbs. of harvested animals, equipment, wood, or other items for transport.

Figure 2:
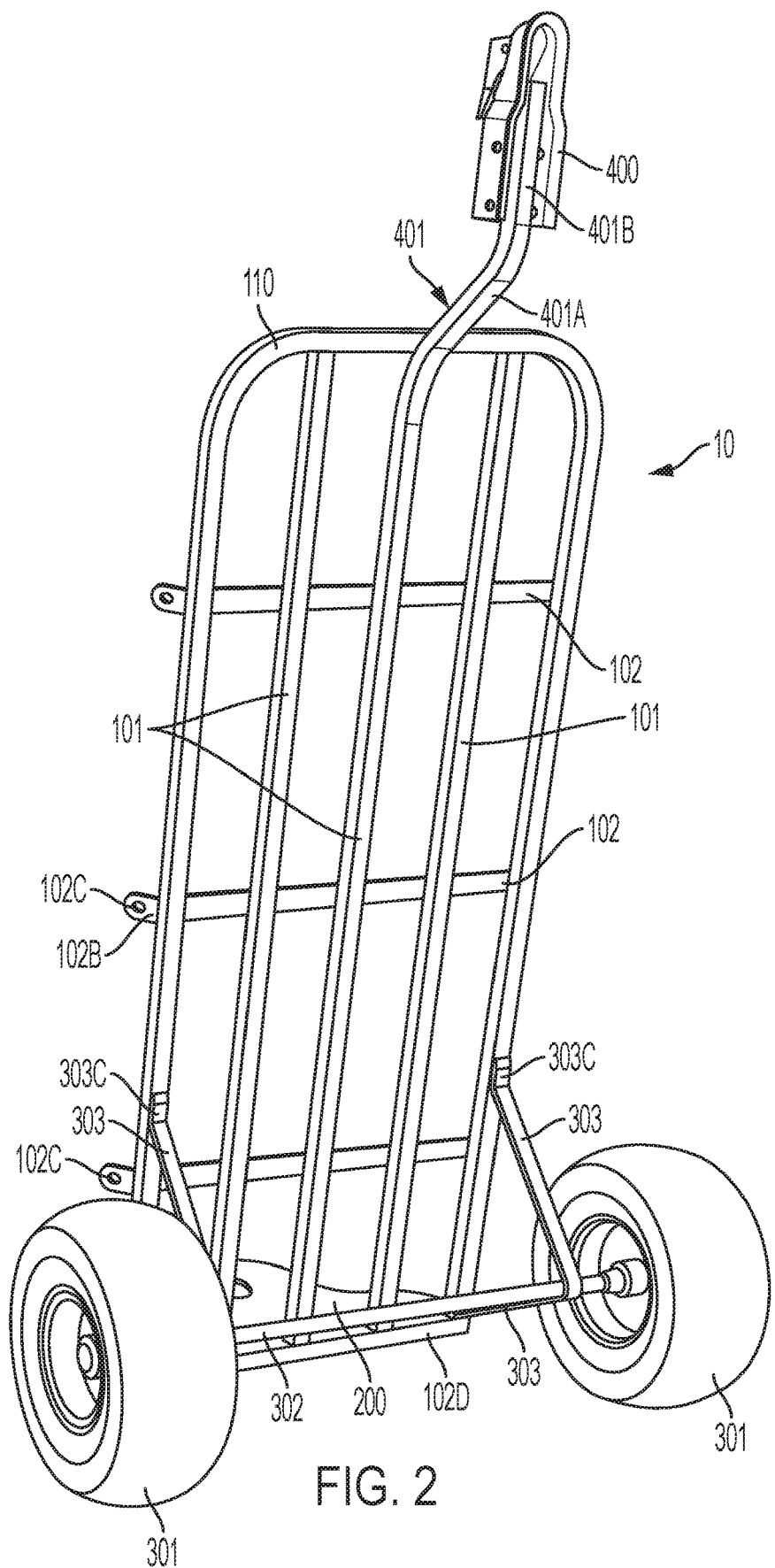
FIG. 2 is another perspective view of the embodiment of the disclosed technology shown in FIG. 1.
Figure 3:
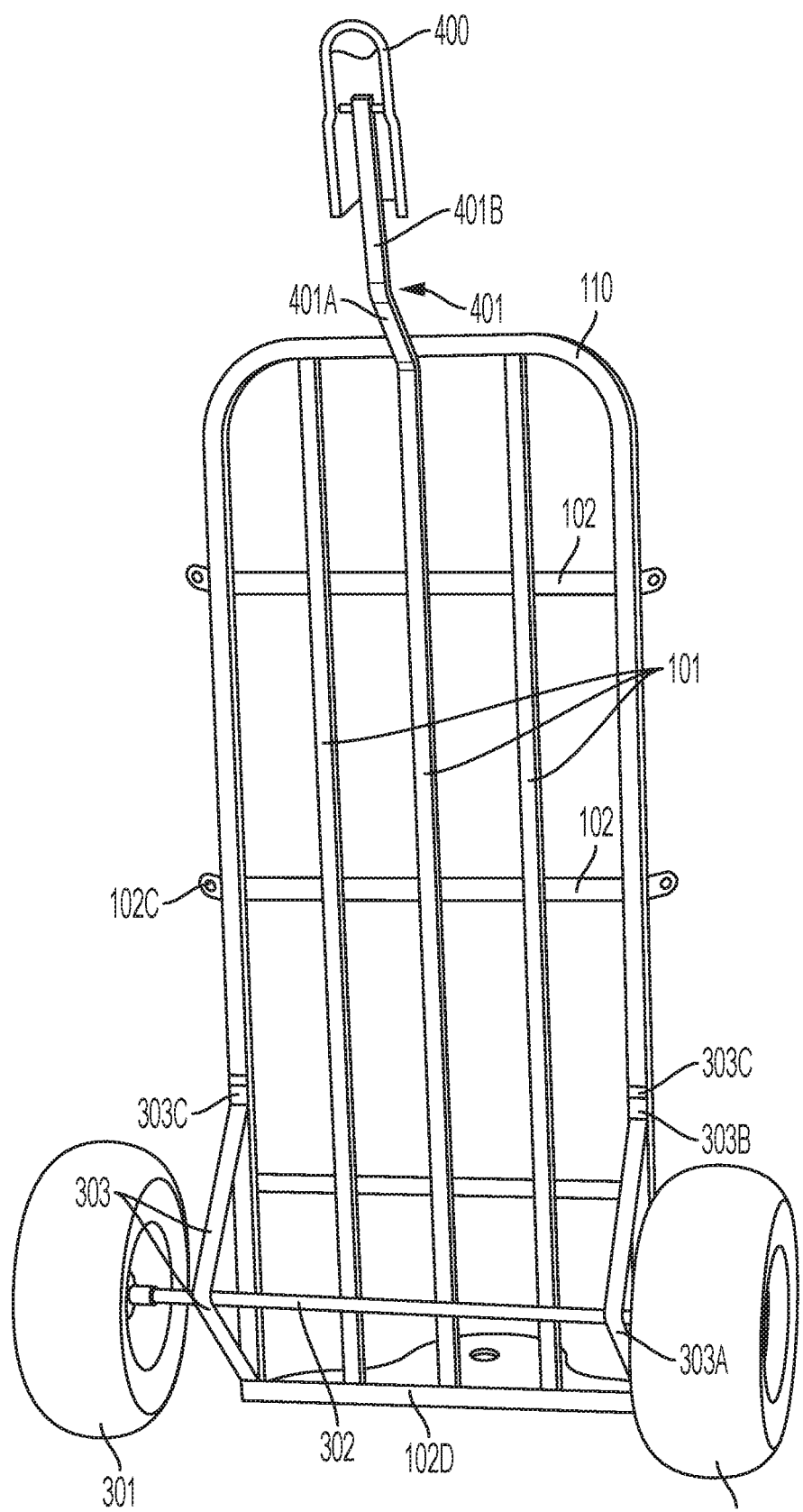
FIG. 3 is another perspective view of the embodiment of the disclosed technology shown in FIG. 1.
Figure 4:
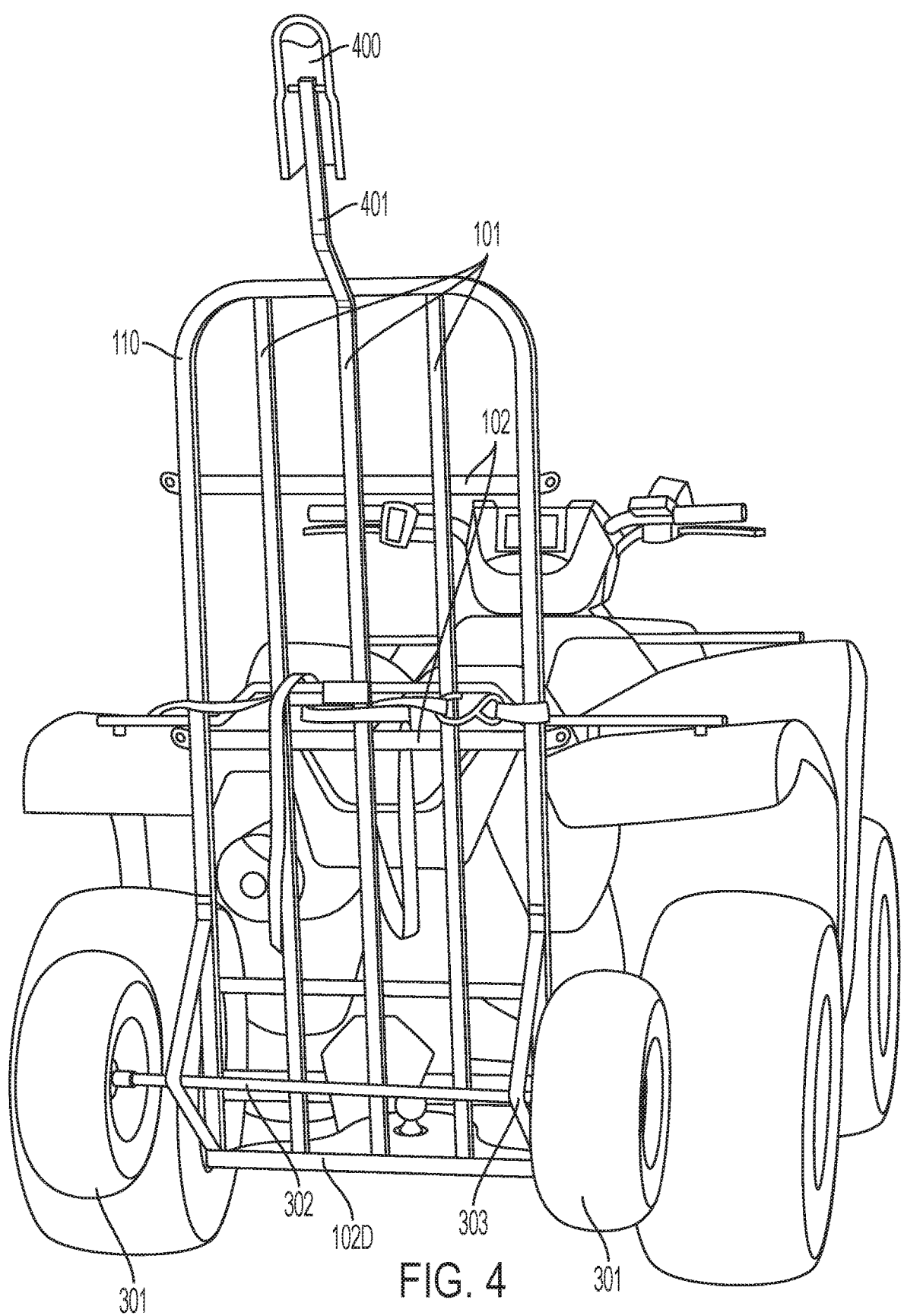
FIG. 4 is a perspective view of the embodiment of the disclosed technology shown in FIG. 1, as affixed in a first configuration to an ATV.

In some embodiments, such as shown in FIGS. 2-4, a first end of the frame 110 and the longitudinal bars 101 forming the bed 10 at the first end, may be conjoined and supported by another support bar 102D, which may be positioned and secured beneath the frame or bed, as shown, or within the plane of the bed. This support bar 102D may also be made from square steel tubing or similar steel elongated structures, and may have a length equidistant with the width of the frame, or slightly longer or shorter, so long as it does not interfere with operation of the trailer.

Figure 5:
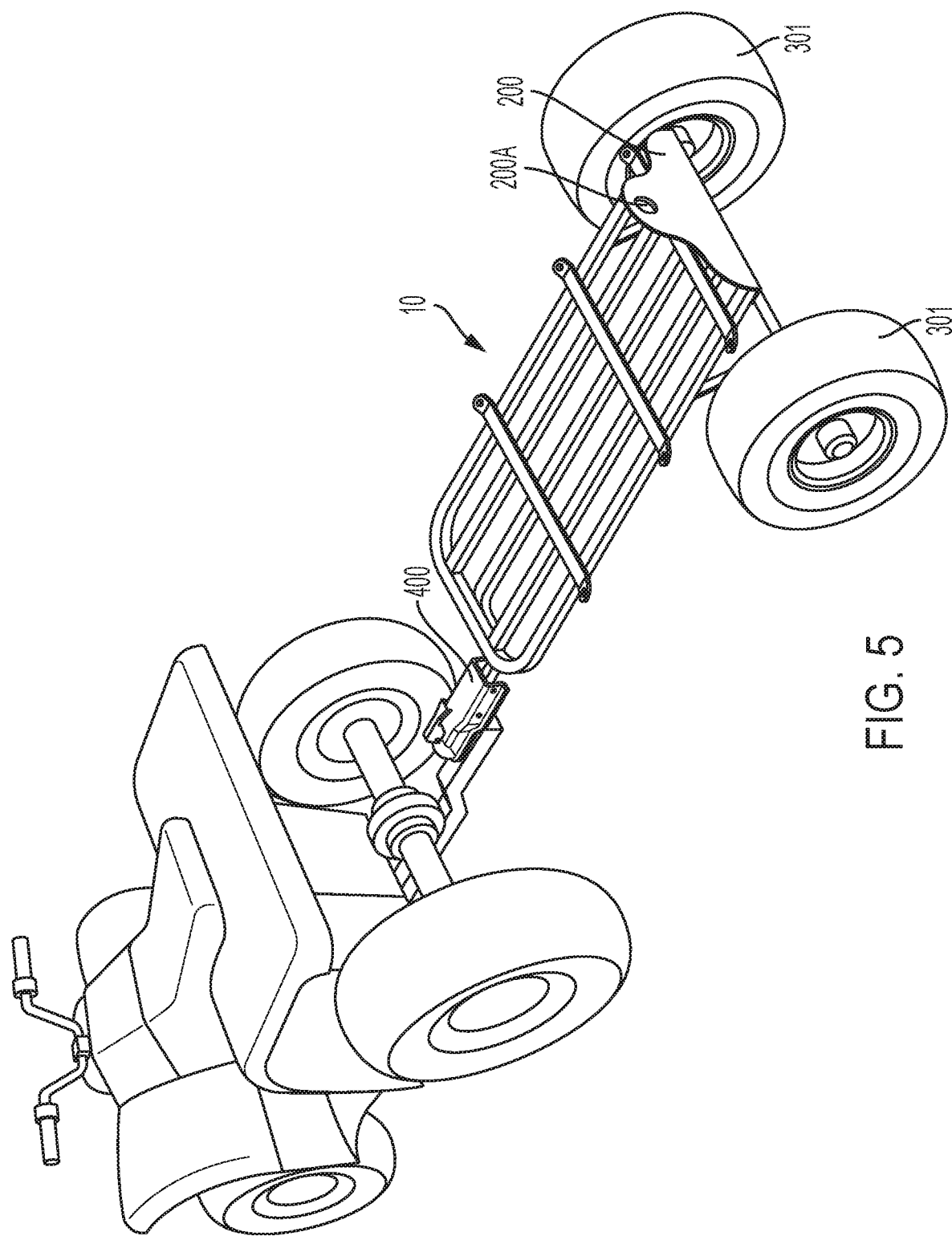
FIG. 5 is a perspective view of the embodiment of the disclosed technology shown in FIG. 1, as affixed in a second configuration to an ATV.

In certain embodiments, as shown specifically in FIGS. 1 and 5, at least some of the latitudinal bars 102 have bent ends 102B so that the ends extend upward from the midsection of the bar, at an angle of between 15° to 75°, or between 30° to 50°, from the plane of the bed. When positioned on and affixed to the frame, the latitudinal bars extend beyond sides of the frame, so that the bend at each end of the latitudinal bars commences near, at or beyond the outermost edge of the frame. For example, if the frame has a width of 20", the latitudinal bars may have a length of 25.25", with the bend occurring at 2.6" from each end of the latitudinal bar.

Further, as shown best in FIGS. 1 and 5, at least some of the latitudinal bars 102 include apertures 102C positioned at each end of the latitudinal bar, beyond the bend. The ends of these latitudinal bar may be tapered and curved. The apertures 102C are intended to receive the hooks or other securing ends of a bungee cord or similar elastic cords or rubber straps, which may be useful to secure cargo to the bed.

In some embodiments the latitudinal bars 102 may be steel bars having a width of between 1" and 2", and a thickness of between ⅛" to ½", or ¼".

As shown in FIGS. 1-5, affixed to and extending perpendicularly upward from the first end of the bed is a base plate 200. The base plate has an aperture 200A positioned thereon, sized to receive the ball hitch of an ATV. The aperture 200A is positioned on the plate 200 so that when the ball hitch of the ATV is received within the aperture, the wheels of the trailer do not touch or are not otherwise impeded by other structural components of the ATV (see, e.g., FIG. 4). In the embodiment shown, the plate has a linear edge 200E at its point of affixation to the first end of the bed (affixed to the end of the frame, the longitudinal bars forming the bed, or the support bar 102D, or any combination thereof), and extends therefrom with the exterior edges forming a first support area 200B, and a second support area 200C. As shown in FIG. 1, the first support area 200B extends from the linear edge 200E, and may include (as shown) curvilinear edges E1 at the opposing end thereof; the second support area 200C extends from the first support area and may also include curvilinear edges E2 at the opposing end thereof. By this configuration, a user may load the dolly onto the back of the ATV by pivoting the bed of the trailer over its wheels so that the aperture receives the ball hitch of the ATV as it pivots from a horizontal position to a vertical position. Alternatively, the shape of the plate or portions thereof may be rectangular. By these or other configurations, the base plate functions as a means to affix the trailer in an upright position relative to the ATV for secure transport, as well as a retaining mechanism to retain cargo when the trailer is used as a dolly independent of the ATV, or as a trailer extending behind and coupled with the ATV.

Positioned below the bed 10 near the first end thereof are a pair of wheels 301 rotatably affixed to an axle 302. As shown in FIGS. 1-3, the axle 302 is supported under the bed 10 by a pair of axle support bars 303, which may be angularly conjoined 303A and affixed at ends 303B to the underside of the sides of the frame. The axle 302 is affixed to the axle support bars 303, where the same are conjoined; in some embodiments the axle is about 6" to 8" off of the ground when the bed is parallel with the ground. In the embodiment shown, at least one of the axle support bars has an affixation tab 303C extending from the second end of the bar, which affixation tab extends at an angle from the remainder of the bar to facilitate secure affixation of the axle support bar to the underside of the frame. The dimensions and configuration of the axle support bars, the axle, and the wheels, determine the distance between the bed and the ground; in some embodiments this distance may be 12" to 20", or 14" to 16".

A particular advantage to the trailer as herein described is that it has a low center of gravity, so the trailer is less likely to tip over or roll over while affixed to and extending from the rear of the ATV.

Finally, extending centrally from a second end of the bed 10 is a straight-tongue trailer coupler 400 affixed to or integral with the frame at the first end of the trailer by means of a coupler support bar 401. The coupler support bar has a first segment 401A which traverses at an angle from and below the plane of the bed 10, and a second segment 401B which is parallel with and below the plane of the bed. The trailer coupler 400 receives and is secured to the second segment 401B of the support bar. The support bar may be constructed from square steel tubing, similar to the tubing of the frame. By this configuration, the trailer can be removably affixed to the ball hitch of the ATV, and aligned with the ATV so that when so affixed the bed is substantially parallel with the ground.

All or some of the frame 110, longitudinal bars 101, the latitudinal bars 102, the base plate 200, the axle support bars 303, the axle 302, the coupler support bar 401, or the trailer coupler 400, or any combination or components thereof, may be welded or otherwise affixed or formed as integral components, in the configuration hereinabove described.

By this configuration, a method of the disclosed technology can be practiced by providing a trailer as hereinabove generally described, and securing the trailer to the ATV by receiving the ball hitch within the aperture of the base plate so that the trailer extends vertically above the ground (as shown in FIG. 4). The trailer can further be secured to the ATV by means of a cam buckle or similar securing means, where the cam buckle straps are positioned about the rear rack of the ATV and the bed of the trailer, and tightly secured. A second method includes providing a trailer of the disclosed technology, and receiving the ATV ball hitch within the trailer coupler so that the wheels of the trailer are positioned on the ground, extending from a back of the ATV, with the bed of the trailer parallel with the ground (as shown in FIG. 5).

Although particular embodiments of the invention have been disclosed in detail for illustrative purposes, it will be recognized that variations or modifications of the disclosed apparatus and method, including the rearrangement of parts, lie within the scope of the invention.

The invention claimed is:

1. A trailer designed to be removably attached to a rear end of an All-Terrain Vehicle (ATV), the trailer comprising:
    a bed including a frame forming sides of the bed and a second end, a plurality of longitudinal bars affixed to and in the plane of the frame, and a plurality of latitudinal bars affixed to top surfaces of the frame and the longitudinal bars,
        wherein the latitudinal bars have bent ends so that the ends extend beyond the sides of the bed and upward from a midsection of the latitudinal bar and a plane of the bed,
        wherein the bent ends of the latitudinal bars extend from a point near, at or beyond an outermost edge of a side of the bed, and
        wherein the latitudinal bars include apertures positioned at each end of the latitudinal bars;
    a pair of wheels supported under the bed at a first end;
    a base plate secured to and extending perpendicularly upward from the first end of the bed, the base plate having an aperture positioned thereon sized to receive a ball hitch of an ATV; and
    a trailer coupler affixed to the frame at the second end of the bed.

2. The trailer of claim 1, further comprising a support bar at a first end of the bed, the support bar being affixed to the frame and the longitudinal bars, wherein the support bar is positioned and secured beneath the frame.

3. The trailer of claim 1, wherein the bent ends of the latitudinal bars extend upward at an angle of between 15° to 75° from the midsection of the latitudinal bars.

4. The trailer of claim 1, wherein the aperture is positioned on the base plate so that when the ball hitch of the ATV is received within the aperture, the wheels of the trailer do not touch or are not otherwise impeded by other structural components of the ATV.

5. The trailer of claim 4, wherein the base plate has a linear edge at its point of affixation to the first end of the bed, and extends therefrom with its exterior edges forming a first support area and a second support area, and wherein the first support area extends from the linear edge and includes curvilinear edges at an opposing end thereof; the second support area extends from the first support area and also includes curvilinear edges.

6. The trailer of claim 1, wherein the wheels are rotatably affixed to an axle and extending laterally from the underside of the bed near the first end thereof, and wherein the axle is supported under the bed by a pair of axle support bars, which are angularly conjoined and affixed to the underside of the bed at respective ends of the axle support bars.

7. The trailer of claim 6, wherein at least one of the axle support bars has an affixation tab extending from a second end of the bar, which affixation tab extends at an angle from the remainder of the bar to facilitate secure affixation of the axle support bar to the underside of the bed.

8. The trailer of claim 1, wherein the trailer coupler is a straight-tongue trailer coupler affixed to or integral with the bed by means of a coupler support bar, and wherein the coupler support bar has a first segment which traverses at an angle from and below the plane of the bed, and a second segment which is parallel with and below the plane of the bed, and wherein the trailer coupler is affixed to the second segment of the support bar.

9. A method for securing a trailer to an All-Terrain Vehicle (ATV) having a ball hitch, the method comprising the steps of:
   providing a trailer comprising:
      a bed including a frame forming sides of the bed and a second end, a plurality of longitudinal bars affixed to and in the plane of the frame, and a plurality of latitudinal bars affixed to top surfaces of the frame and the longitudinal bars, wherein the latitudinal bars have bent ends so that the ends extend beyond the sides of the bed and upward from a midsection of the latitudinal bar and a plane of the bed, wherein the bent ends of the latitudinal bars extend from a point near, at or beyond an outermost edge of a side of the bed, and wherein the latitudinal bars include apertures positioned at each end of the latitudinal bars;
      a pair of wheels supported under the bed at a first end;
      a base plate secured to and extending perpendicularly upward from the first end of the bed, the base plate having an aperture positioned thereon sized to receive a ball hitch of an ATV; and
      a trailer coupler affixed to a second end of the bed; and
   securing the trailer to the ATV by receiving the ball hitch within the aperture of the base plate so that the trailer extends vertically above the ground.

10. The method of claim 9, wherein the trailer further comprises a support bar at a first end of the bed, the support bar being affixed to the frame and the longitudinal bars, wherein the support bar is positioned and secured beneath the frame.

11. The method of claim 9, wherein the bent ends of the latitudinal bars of the trailer extend upward at an angle of between 15° to 75° from the midsection of the latitudinal bars.

12. The method of claim 9, wherein the aperture is positioned on the base plate of the trailer so that when the ball hitch of the ATV is received within the aperture, the wheels of the trailer do not touch or are not otherwise impeded by other structural components of the ATV.

13. The method of claim 12, wherein the base plate of the trailer has a linear edge at its point of affixation to the first end of the bed, and extends therefrom with its exterior edges forming a first support area and a second support area, and wherein the first support area extends from the linear edge and includes curvilinear edges at an opposing end thereof; the second support area extends from the first support area and also includes curvilinear edges.

14. The method of claim 9, wherein the wheels of the trailer are rotatably affixed to an axle and extending laterally from the underside of the bed near the first end thereof, and wherein the axle is supported under the bed by a pair of axle support bars, which are angularly conjoined and affixed to the underside of the bed at respective ends of the axle support bars.

15. The method of claim 14, wherein at least one of the axle support bars of the trailer has an affixation tab extending from a second end of the bar, which affixation tab extends at an angle from the remainder of the bar to facilitate secure affixation of the axle support bar to the underside of the bed.

16. The method of claim 9, wherein the trailer coupler is a straight-tongue trailer coupler affixed to or integral with the bed by means of a coupler support bar, and wherein the coupler support bar has a first segment which traverses at an angle from and below the plane of the bed, and a second segment which is parallel with and below the plane of the bed, and wherein the trailer coupler is affixed to the second segment of the support bar.

17. A method for securing a trailer to an All-Terrain Vehicle (ATV) having a ball hitch, the method comprising the steps of:
   providing a trailer comprising:
      a bed including a frame forming sides of the bed and a second end, a plurality of longitudinal bars affixed to and in the plane of the frame, and a plurality of latitudinal bars affixed to top surfaces of the frame and the longitudinal bars, wherein the latitudinal bars have bent ends so that the ends extend beyond the sides of the bed and upward from a midsection of the latitudinal bar and a plane of the bed, wherein the bent ends of the latitudinal bars extend from a point near, at or beyond an outermost edge of a side of the bed, and wherein the latitudinal bars include apertures positioned at each end of the latitudinal bars;
      a pair of wheels supported under the bed at a first end;
      a base plate secured to and extending perpendicularly upward from the first end of the bed, the base plate having an aperture positioned thereon sized to receive a ball hitch of an ATV; and
      a trailer coupler affixed to a second end of the bed; and
   securing the trailer to the ATV by receiving the ball hitch within the trailer coupler so that the wheels are positioned on the ground, extending from a back of the ATV.

18. The method of claim 17, wherein the bent ends of the latitudinal bars of the trailer extend upward at an angle of between 15° to 75° from the midsection of the latitudinal bars.

19. The method of claim 17, wherein the wheels of the trailer are rotatably affixed to an axle and extending laterally from the underside of the bed near the first end thereof, and wherein the axle is supported under the bed by a pair of axle support bars, which are angularly conjoined and affixed to the underside of the bed at respective ends of the axle support bars.

20. The method of claim 17, wherein the trailer coupler is a straight-tongue trailer coupler affixed to or integral with the bed by means of a coupler support bar, and wherein the coupler support bar has a first segment which traverses at an angle from and below the plane of the bed, and a second segment which is parallel with and below the plane of the bed, and wherein the trailer coupler is affixed to the second segment of the support bar.

\* \* \* \* \*